(12) United States Patent
Little (10) Patent No.: US 9,201,919 B2
(45) Date of Patent: Dec. 1, 2015

(54) BANDWIDTH OPTIMIZED TWO-PHASE COMMIT PROTOCOL FOR DISTRIBUTED TRANSACTIONS

(71) Applicant: Red Hat, Inc., Raleigh, NC (US)

(72) Inventor: Mark Cameron Little, Ebchester (GB)

(73) Assignee: Red Hat, Inc., Raleigh, NC (US)

( * ) Notice: Subject to any disclaimer, the term of this patent is extended or adjusted under 35 U.S.C. 154(b) by 261 days.

(21) Appl. No.: 13/889,200

(22) Filed: May 7, 2013

(65) Prior Publication Data

US 2014/0337303 A1 Nov. 13, 2014

(51) Int. Cl.
*G06F 17/30* (2006.01)

(52) U.S. Cl.
CPC ................ *G06F 17/30371* (2013.01)

(58) Field of Classification Search
CPC . G06F 9/466; G06F 17/30371; G06F 9/4812; G06F 9/546; G06F 17/30368; G06F 2201/84; G06F 2209/501; G06F 9/5027; G06F 11/0709; G06F 11/0757; G06F 2201/87
See application file for complete search history.

(56) References Cited

U.S. PATENT DOCUMENTS

| | | | |
|---|---|---|---|
| 5,761,721 A | 6/1998 | Baldus et al. | |
| 5,781,910 A | 7/1998 | Gostanian et al. | |
| 6,138,143 A | 10/2000 | Gigliotti et al. | |
| 6,157,927 A | 12/2000 | Schaefer et al. | |
| 6,266,698 B1 | 7/2001 | Klein et al. | |
| 6,286,110 B1 | 9/2001 | Klein et al. | |
| 6,301,601 B1 | 10/2001 | Helland et al. | |
| 6,438,582 B1 | 8/2002 | Hsiao | |
| 6,493,726 B1 | 12/2002 | Ganesh et al. | |
| 6,738,971 B2 | 5/2004 | Chandrasekaran et al. | |
| 7,197,533 B2 | 3/2007 | Vincent et al. | |
| 7,290,056 B1 | 10/2007 | McLaughlin, Jr. | |
| 7,337,441 B2 | 2/2008 | Felt et al. | |
| 7,346,905 B2 | 3/2008 | Dorrance et al. | |
| 7,441,025 B2* | 10/2008 | Felt et al. | 709/223 |
| 7,818,429 B2 | 10/2010 | Barghouthi et al. | |
| 8,001,548 B2* | 8/2011 | Groff et al. | 718/104 |
| 8,055,711 B2* | 11/2011 | Fachan et al. | 709/205 |
| 8,213,295 B2 | 7/2012 | Ginde | |
| 8,271,448 B2* | 9/2012 | Parkinson et al. | 707/661 |
| 8,396,961 B2 | 3/2013 | Little | |
| 2001/0011228 A1 | 8/2001 | Shenkman | |
| 2004/0215594 A1* | 10/2004 | Somogyi et al. | 707/1 |
| 2005/0055325 A1 | 3/2005 | Dutt et al. | |

(Continued)

FOREIGN PATENT DOCUMENTS

GB 2335516 A1 9/1999

OTHER PUBLICATIONS

Samaras, George, et al, "Two-Phase Commit Optimizations in a Commercial Distributed Environment," Oct. 1995, Distributed and Parallel Databases, vol. 3 No. 4, 38 pages.

(Continued)

*Primary Examiner* — Debbie Le
(74) *Attorney, Agent, or Firm* — Lowenstein Sandler LLP (57) ABSTRACT

A processing device executing a transaction manager sends prepare messages to a plurality of participants of a two-phase commit distributed transaction. Responsive to receiving commit responses from each of the plurality of participants, the processing device commits the two-phase commit distributed transaction. The processing device then ends the two-phase commit distributed transaction without first sending commit messages to the plurality of participants.

20 Claims, 7 Drawing Sheets

(56) References Cited

U.S. PATENT DOCUMENTS

| | | | |
|---|---|---|---|
| 2005/0119908 A1 | 6/2005 | Hippe et al. | |
| 2005/0187891 A1 | 8/2005 | Johnson et al. | |
| 2006/0095438 A1* | 5/2006 | Fachan et al. | 707/10 |
| 2006/0143186 A1 | 6/2006 | Whyte | |
| 2007/0072163 A1 | 3/2007 | Groff et al. | |
| 2008/0034082 A1 | 2/2008 | McKinney | |
| 2008/0046608 A1 | 2/2008 | Lee et al. | |
| 2008/0062863 A1 | 3/2008 | Ginde | |
| 2008/0235245 A1* | 9/2008 | Huras et al. | 707/10 |
| 2008/0312998 A1 | 12/2008 | Templeton et al. | |
| 2009/0300022 A1* | 12/2009 | Little | 707/10 |
| 2010/0017642 A1* | 1/2010 | Myers | 714/2 |
| 2010/0223217 A1 | 9/2010 | Little | |
| 2011/0055376 A1 | 3/2011 | Little | |
| 2011/0246822 A1* | 10/2011 | Little | 714/16 |
| 2012/0166889 A1* | 6/2012 | El-Kersh et al. | 714/48 |
| 2013/0318146 A1* | 11/2013 | Kanthak et al. | 709/201 |

OTHER PUBLICATIONS

Attaluri, G.K, et al., "The Presumed-Either Two-Phase Commit Protocol," Sep./Oct. 2002, IBM Canada Ltd., Toronto, Ont. / IEEE Transactions on Knowledge and Data Engineering, vol. 14 No. 5, 9 pages.

JBoss Inc, J Boss Transactions 4.2.3, JTS Programmers Guide, © 2007, 117 pages.

Johnson, Rod, et al. "Spring java/j2ee Application Framework, The Spring Framework—Reference Documentation", Version 2.5.6, © 2004-2008, 590 pages.

Abdallah, M., et al., "One-phase commit: does it make sense?", Parallel and Distributed Systems, 1998, Proceedings, 1998 International Conference, Dec. 14-16, 1998, 12 pages.

Lampson, Butler and Lomet, David, "A New Presumed Commit Optimization for Two Phase Commit", Cambridge Research Laboratory, Technical Report Series, Feb. 10, 1993, 26 pages.

Samaras, George, et al., "Two Phase Commit Optimizations and Tradeoffs in the Commercial Environment", IBM Distributed Systems Architecture, IBM Almaden Research Center, © 1993, 10 pages.

* cited by examiner

BANDWIDTH OPTIMIZED TWO-PHASE COMMIT PROTOCOL FOR DISTRIBUTED TRANSACTIONS

TECHNICAL FIELD

Embodiments of the present invention relate to distributed transactions, and more specifically to a bandwidth optimized two-phase commit protocol for distributed transactions.

BACKGROUND

Distributed transactions are often performed on distributed computing systems. A distributed transaction is a set of operations that update shared objects. Distributed transactions should satisfy the properties of Atomicity, Consistency, Isolation and Durability, known commonly as the ACID properties. According to the Atomicity property, either the transaction successfully executes to completion, and the effects of all operations are recorded, or the transaction fails. The Consistency property ensures that the transaction does not violate integrity constraints of the shared objects. The Isolation property ensures that intermediate effects of the transaction are not detectable to concurrent transactions. Finally, the Durability property ensures that changes to shared objects due to the transaction are permanent.

To ensure the Atomicity property, all participants of the distributed transaction coordinate their actions so that they either unanimously abort or unanimously commit to the transaction. A two-phase commit protocol is commonly used to ensure Atomicity. Under the two-phase commit protocol, the distributed system performs the commit operation in two phases. In the first phase, commonly known as the prepare phase or request phase, a coordinator (a node in the distributed computing system managing the transaction) asks all participants (nodes in the distributed computing system participating in the transaction) whether they are able to commit to the transaction. During the second phase, commonly known as the commit phase, the coordinator node determines whether the transaction should be completed. If during the prepare phase all participant nodes committed to the transaction, the coordinator node successfully completes the transaction and sends commit messages to each of the participants. If during the prepare phase one or more participant nodes failed to commit to the transaction, the coordinator node does not complete the transaction and sends roll back message to each of the participants.

BRIEF DESCRIPTION OF THE DRAWINGS

Embodiments of the present invention are illustrated by way of example, and not by way of limitation, in the figures of the accompanying drawings and in which.

DETAILED DESCRIPTION

In conventional two-phase commit protocols (including the presumed abort optimization, presumed commit optimization, and presumed nothing optimization) a transaction manager sends a commit message to each participant of a transaction instructing the participant to commit to a transaction. The participants then commit the transaction and send a commit confirmation to the transaction manager. After receiving commit confirmations from all participants, the transaction manager commits and then ends the transaction. In the aggregate, the commit messages and commit confirmations can consume a considerable amount of network bandwidth.

Described herein is a method and apparatus for performing distributed transactions using a bandwidth optimized two-phase commit protocol. For a distributed transaction that uses a bandwidth optimized two-phase commit protocol, a transaction manager sends prepare messages to a plurality of participants of the distributed transaction. Responsive to receiving commit responses from each of the plurality of participants, the transaction manager commits the two-phase commit distributed transaction. The transaction manager then ends the two-phase commit distributed transaction without first sending commit messages to the plurality of participants. The participants wait a specified time period. If the participants fail to receive a roll back message from the transaction manager within the time period, then the participants automatically commit the transaction.

Embodiments of the present invention provide a bandwidth optimized two-phase commit protocol that causes fewer messages to be sent between participants and a coordinator of a two-phase commit distributed transaction. Participants of the transaction may include a timer, and wait for a roll back message to be received within a specified time period. If no roll back message is received from the coordinator within the time period, then the participants automatically commit to the transaction. This enables the coordinator and participants all to commit to the transaction without the coordinator sending commit messages to the participants or the participants responding with commit confirmations, thus reducing a number of messages exchanged during the transaction and reducing usage of network bandwidth. Thus, the bandwidth optimized two-phase commit protocol described in embodiments herein consumes less network bandwidth than conventional two-phase commit protocols.

It should be noted that embodiments are described below with reference to a bandwidth optimized two-phase commit protocol that is optimized for commit decisions. Under such a bandwidth optimized two-phase commit protocol, no commit messages are sent from a transaction manager to participants, thus minimizing network traffic for instances in which a transaction is to be committed. This is appropriate for most transaction systems, in which transactions are successfully committed over 90% of the time (e.g., 99.9% of the time). However, in some transaction systems there is a larger percentage of rolled back transactions (also referred to as aborted transactions). For such systems, a bandwidth optimized two-phase commit protocol that is optimized for roll back decisions may be used.

Under a bandwidth optimized two-phase commit protocol optimized for abort decisions, commit messages are sent to participants. However, if a roll back decision is reached by the transaction manager, the transaction manager does not send any roll back messages to the participants. The participants will wait a designated time period, and will automatically roll back the transaction if they fail to receive a commit message within that time period. Embodiments discussed below with reference to a bandwidth optimized two-phase commit protocol in which no commit messages are transmitted may be modified such that commit messages are transmitted but roll back messages are not transmitted.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "determining", "notifying", "sending", "receiving", "committing", or the like, refer to the actions and processes of a computing device that manipulates and transforms data represented as physical (electronic) quantities within the computing device's registers and memories into other data similarly represented as physical quantities within the computing device's memories or registers or other such information storage, transmission or display devices.

Embodiments of the present invention also relate to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Embodiments of the present invention may be provided as a computer program product, or software, that may include a computer-readable medium having stored thereon instructions, which may be used to program a computer system (or other electronic devices) to perform a process according to the present invention. A computer-readable medium includes any mechanism for storing information in a form readable by a machine (e.g., a computer). For example, a computer-readable medium includes a read only memory ("ROM"), random access memory ("RAM"), magnetic disk storage media, optical storage media, flash memory device, etc.

Figure 1:
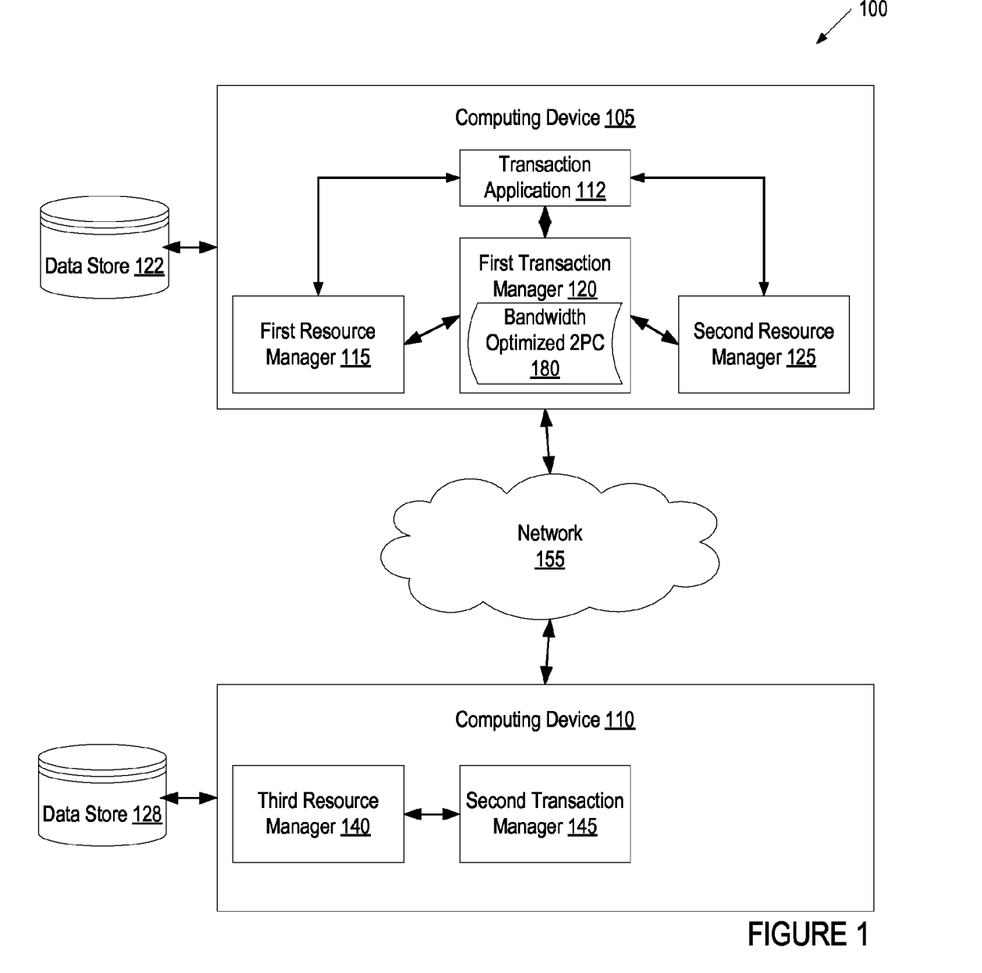
FIG. 1 illustrates an example distributed computing system, in which embodiments of the present invention may operate.

FIG. 1 illustrates an example distributed computing system 100, in which embodiments of the present invention may operate. The distributed computing system 100 may include a service oriented architecture (SOA) (an information system architecture that organizes and uses distributed capabilities (services) for one or more applications). An SOA provides a uniform means to offer, discover, interact with and use capabilities (services) distributed over a network. Through the SOA, applications may be designed that combine loosely coupled and interoperable services.

In one example, the distributed computing system 100 includes an enterprise service bus (ESB). An ESB is an event-driven and standards-based messaging engine that provides services for more complex architectures. The ESB provides an infrastructure that links together services and clients to enable distributed applications and processes. The ESB may be implemented to facilitate an SOA. In one example, the ESB is a single bus that logically interconnects all available services and clients. Alternatively, the ESB may include multiple buses, each of which may logically interconnect different services and/or clients.

The distributed computing system 100 may include multiple computing devices 105, 110 connected via a network 155, which may be a private network (e.g., a local area network (LAN), wide area network (WAN), etc.), a public network (e.g., the Internet), or a combination of a private network and a public network. Alternatively, the distributed computing system 100 may include a single computing device and/or the computing devices 105, 110 may be directly connected to each other.

Each computing device 105, 110 may be a client computing device or a server computing device. Computing devices may be, for example, personal computers (PC), palm-sized computing devices, personal digital assistants (PDA), rack-mount servers, tablet computers, notebook computers, mobile phones, etc. Computing device 105 and computing device 110 may each be a single machine, or may include multiple interconnected machines (e.g., server machines configured in a cluster).

In one embodiment, computing devices 105, 110 are connected to data stores 122, 128. Data stores 122, 128 may include a file system, a database, or other data storage arrangement. Data stores 122, 128 may be internal to computing devices 105, 110, or external and connected to computing device 105, 110 either directly or via a network.

Computing device 105 and/or computing device 110 may host services, applications and/or other functionality that is available to other computing devices (e.g., to clients) on the distributed computing system 100. Alternatively, or in addition, computing devices 105, 110 may act as clients that access services provided by other computing devices. In one example, the computing device 105 includes a first transaction manager 120 including instructions for a bandwidth optimized two-phase commit protocol (2PC) 180, a first resource manager 115 and a second resource manager 125, and computing device 110 includes a second transaction manager 145 and a third resource manager 140.

A transaction manager is a software module with computer readable instructions that coordinates multiple participants during a distributed transaction. A participant may be another transaction manager or a local resource manager. For example, if first transaction manager 120 acts as coordinator for a distributed transaction, second transaction manager 145, first resource manager 115 and second resource manager 125 may be participants to the distributed transaction.

A resource manager may be a software module with computer readable instructions that manages a storage system, which is typically a persistent and stable storage system. A resource manager may be an external system accessed by an application. A resource manager provides and enforces the ACID transaction properties for specific data and operations. Examples of resource managers include a relational database (which supports persistent storage of relational data), an executive information system (EIS), and the Java Message Service (JMS) provider (which manages transactional message delivery). Other examples of resource managers include other types of databases and file managers.

First transaction manager 120 and second transaction manager 145 may each act as master coordinators or intermediate coordinators to coordinate distributed transactions. Coordinating a distributed transaction includes determining whether each participant can commit to a transaction, causing each participant to commit if all are able, and causing each participant to roll back the transaction if not all participants are able to commit. As described in greater detail below, first transaction manager 120 may manage a distributed transaction using a bandwidth optimized two-phase commit protocol. Under the bandwidth optimized two-phase commit protocol, the first transaction manager 120 may cause participants to rollback a transaction by sending roll back messages to those participants. However, the first transaction manager 120 may not send out any messages to cause the participants to commit to the transaction. Instead, the participants may automatically commit responsive to failing to receive a rollback message within a particular time period.

A master coordinator is a transaction manager that acts on behalf of a process that initiates a distributed transaction (e.g., by initiating a commit operation) to coordinate participants of the distributed transaction. A master coordinator arrives at a commit or abort decision and may propagate that decision to participants. In one embodiment, the master coordinator propagates abort decisions but does not propagate commit decisions. Alternatively, the master coordinator may propagate commit decisions but may not propagate roll back decisions.

An intermediate coordinator is a transaction manager that acts on behalf of a process that participates in a distributed transaction to coordinate local resource managers and/or additional transaction managers that are participants in the distributed transaction. An intermediate coordinator gathers information about the participants that it manages, and reports the information to a master coordinator. An intermediate coordinator may also receive commit or abort decisions from a master coordinator, and propagate the decisions to participants that it manages.

In one example, first transaction manager 120 acts as a master coordinator, and coordinates a distributed transaction between first resource manager 115, second resource manager 125 and second transaction manager 145. The first transaction manager 120 may establish a new transaction upon receiving a request from a transaction application 112 to perform the transaction. A transaction application 112 may be any application that requests that operations be performed transactionally or that otherwise causes distributed transactions to be initiated. The transaction application 112 may be collocated with the first transaction manager 120 (as shown), or may be located on a remote machine (e.g., on computing device 110).

First transaction manager 120 may initiate a bandwidth optimized two-phase commit distributed transaction and determine all participants for the distributed transaction. First transaction manager 120 may also act as an intermediate coordinator, and coordinate a distributed transaction between only first resource manager 115 and second resource manager 125.

Each resource manager that participates in a distributed transaction may be a participant of the transaction. During a prepare phase of a two-phase commit distributed transaction, a participant is asked via a prepare message whether it can commit to the transaction by a coordinator (e.g., an intermediate coordinator or a master coordinator).

Upon receiving the prepare message, the resource manager 115, 125, 140 performs an action or set of actions. Typically, the resource manager 115, 125, 140 will generate a snapshot of its state before performing any additional operations to enable the resource manager 115, 125, 140 to roll back to the current state if appropriate. Each resource manager 115, 125, 140 may maintain an undo log (log of committed changes that occur during a distributed transaction) and/or redo log (log of uncommitted changes that occur during a distributed transaction) in the data stores 122, 128. The redo logs and/or undo logs can be used to rollback any changes that occurred during a distributed transaction if the transaction is aborted. These logs may also include an identifier of the coordinator of the transaction, an address of the coordinator, an identification of the transaction, a process identification of a process that started the transaction, a description of the transaction, identification of other participants of the transaction, a timestamp indicating when the transaction was started and/or additional data.

If a resource manager 115, 125, 140 can commit to the transaction, it sends a commit response to the coordinator (e.g., to the first transaction manager 120 or the second transaction manager 145). If the resource manager 115, 125, 140 cannot commit to the transaction, it sends a roll back message (abort message) to the coordinator. Alternatively, if the resource manager 115, 125, 140 will not undergo a state change from the distributed transaction, it can send a read-only response to the coordinator.

During a commit phase of a bandwidth optimized two-phase commit distributed transaction, each resource manager 115, 125, 140 waits a particular time period to receive a roll back command from the coordinator. If no roll back command is received within the time period, a resource manager 115, 125, 140 will commit to the transaction, and will then release one or more locks to resources managed by the resource manager 115, 125, 140. If one or more of the participating resource managers 115, 125, 140 sent an abort response, then all resource managers 115, 125, 140 may receive a roll back message during the commit phase within the time period. The resource managers 115, 125, 140 may then roll back the transaction to a previous state that they had prior to participating in the transaction. Resource managers that responded during the prepare phase with a read-only response may receive no commands/messages during the commit phase.

Figure 2A:
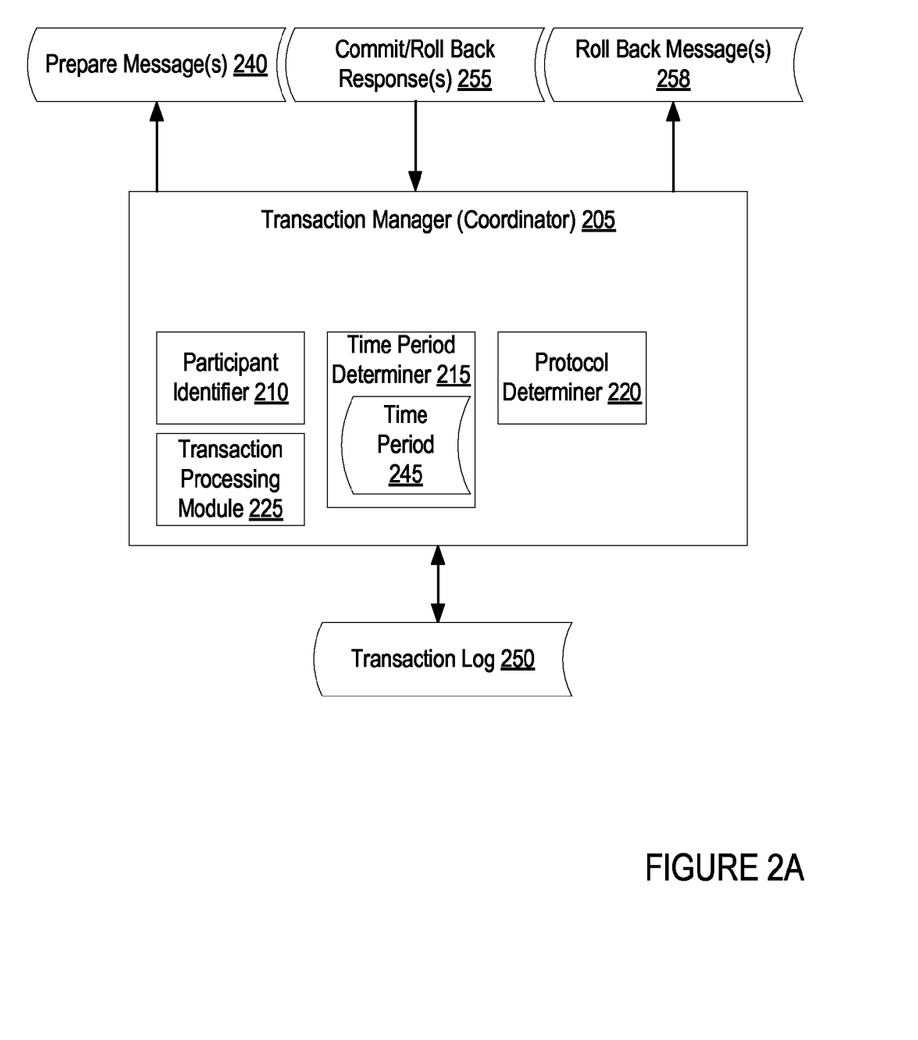
FIG. 2A illustrates a block diagram of a transaction manager that uses a bandwidth optimized two-phase commit protocol, in accordance with one embodiment of the present invention.

FIG. 2A is a block diagram illustrating a transaction manager 205 that uses a bandwidth optimized two-phase commit protocol for distributed transactions, in accordance with embodiments of the present invention. In one example, the transaction manager 205 includes a participant identifier 210, a time period determiner 215, a protocol determiner 220 and a transaction processing module 225. The transaction manager 205 may act as a coordinator for a distributed transaction. Accordingly, transaction manager 205 may initiate and manage a distributed transaction.

A transaction application invokes the transaction manager 205 to coordinate a distributed transaction. When the transaction manager 205 receives a request (e.g., from a client) to initiate a new transaction, the transaction processing module 225 generates the new transaction, the new transaction having a unique transaction identifier. Since multiple clients and/or resources may participate in a transaction, the new transaction has a transaction context, which is associated with the transaction identifier. The transaction context provides an association between transactional operations on the participant resources and the clients or services invoking those operations. The transaction identifier is sent to the entity (e.g., client) that requested the transaction. The requestor (e.g., client) may then send the transaction identifier to each entity (e.g., additional client, application, resource manager, etc.) that will be a participant to the transaction. Alternatively, the requestor may notify transaction manager 205 of the participants, and transaction manager 205 may send the transaction identifier to each of the identified participants.

The transaction manager 205 maintains a log of transactions for which that transaction manager acts or has acted as a transaction coordinator. In one example, the transaction processing module 225 adds an entry to a transaction log 250 for each new transaction. The transaction processing module 225 may record in the transaction log 250 an identification of the transaction associated with an entry (e.g., a transaction identification number), a process identification of the process (e.g., client) that initiated the transaction, a description of the transaction, a timestamp identifying when the transaction was started and/or additional data, participants of the transaction and their addresses, etc.

Once a transaction is generated, participant identifier 210 determines one or more resource managers that will participate in the distributed transaction. In one example, participant identifier 210 receives identification of specific resource managers and/or types of resource managers that will participate in the transaction from the transaction application. Alternatively, or in addition, participant identifier 210 may automatically determine participants for the distributed transaction. Participants may be determined, for example, based on a type of transaction that will be performed. In one example, participant identifier 210 accesses a service directory to identify appropriate resource managers to participate in a particular transaction.

Participant identifier 210 additionally performs participant registration (also known as resource enlistment). Any resources that will be modified, accessed, or otherwise affected by the transaction are registered with the transaction.

Transaction processing module 225 is responsible for actually coordinating a distributed transaction. The transaction processing module 225 administers the bandwidth optimized two-phase commit transaction protocol. Accordingly, during a prepare phase of a bandwidth optimized two-phase commit distributed transaction, the transaction processing module 225 sends a prepare message 240 (also referred to as a commit query) to each participant asking whether the participant can commit to the transaction. If the participant can commit to the transaction, it sends a commit response 255 back to the transaction manager 205. If the participant cannot commit to the transaction, it sends an abort response (also known as a rollback response) 255 to the transaction manager 205.

During a commit phase of a bandwidth optimized two-phase commit distributed transaction, the transaction processing module 225 determines whether to commit a transaction based on the responses that it receives from the participants. Transaction processing module 225 may commit the transaction and then end the transaction without sending any further messages (e.g., without sensing any commit commands to the participants) if all participants indicated that they were able to commit. Alternatively, transaction processing module 225 may commit the transaction, and then asynchronously send commit confirmation messages to the participants to provide confirmation that the transaction was committed. Each participant automatically commits to the transaction after failing to receive a roll back message from the transaction manager 205 within a particular time period. The participants typically do not send any confirmation to the transaction coordinator that they committed the transaction, though in some embodiments the participants may asynchronously send commit conformation messages to the transaction manager 205.

If one or more of the participants sent a roll back response 255 during the prepare phase of the transaction, then the transaction processing module 225 sends a roll back message (an abort command) 258 to each participant during the commit phase. Each participant then rolls back the transaction, and may send a confirmation to the transaction coordinator that the transaction was rolled back. Alternatively, the participants may not send confirmations that the transaction was rolled back. Messages such as the prepare message 240, rollback message 258, etc. may be sent to participants using the participant's addresses that are recorded in the transaction log 220.

Time period determiner 215 may determine a time period 245 to apply for the distributed transaction. The time period 245 is the amount of time that participants will wait for a roll back message before committing a transaction. Time period determiner 215 may determine the time period for a transaction based on a single metric or based on a combination of metrics. These metrics may be based on various categories of historical data, may be based on network conditions, and/or may be based on other data. Alternatively, time period determiner 215 may receive a specified time period 245 that has been provided by, for example, a system administrator. The time period 245 may be on the order of milliseconds (e.g., 1-10 milliseconds), on the order of seconds (e.g., 1-100 seconds), or may have other durations.

Information on what participants and coordinators are located on which machines, where the machines are physically located and dependencies between participants may all be used to compute the time period 245. For example, transactions in which all participants are collocated on a single machine will be completed more quickly in general than transactions that include services located on multiple machines. Similarly, the proximity of the machines to one another is also likely to affect transaction completion time. For example, transactions that include services on nearby machines are likely to complete more quickly than transactions that include services on distant machines.

Monitors dispersed throughout a distributed computing system may monitor components that make up the distributed computing system. The components may include both hardware components and software components. The available components may be monitored based on status reports received from the components, by scanning the distributed computing system (e.g., using SNMP), based on information gathered by a middleware service, a process monitor, etc. Monitoring the components may include monitoring transactions running on the components and/or including the components as participants.

In one implementation, properties of a new transaction and current load on software and hardware components that will be used in the new transaction are applied to a transaction model to compute the time period. Properties of the transaction may include performance characteristics (e.g., processor speed, system memory, operating system, message transport, etc.) of software and/or hardware components that are used by the participating resources, and so on. The transaction model may include variables for one or more factors that can affect transaction completion time, such as participants, load on participants, proximity of participants to one another, data accessed by participants, etc. The time period 245 may be determined using the transaction model and the known parameters for a new transaction.

Once a time period 245 has been determined, transaction manager 205 may send out messages to participants notifying them of the time period 205. In one implementation, the time period data is attached to a participant registration message or to a prepare message. The time period may be for a particular transaction, or may be used for multiple transactions.

For the bandwidth optimized two-phase commit protocol to operate optimally, transaction managers, participants and/or the distributed computing system in which they operate should conform to particular service level agreements (SLAs). In particular, participants should agree not to change a commit decision after responding to a prepare message. For example, if the participant responded to a prepare message with a commit response, then the participant should not then determine to roll back a transaction. Additionally, the network in which the participants and transaction manager operate should not have a network partition or high latency. The SLA for the transaction manager and participants will likely specify a particular response time, indicating that the participants and transaction manager are to respond to messages within a specified time frame. This specified time frame is related to the time period used by participants when determining whether to commit to a transaction. Failure to conform to the above specifications may cause a heuristic outcome for a transaction, in which not all participants agree on whether a transaction was successfully completed.

In one embodiment, protocol determiner 220 determines whether the above specifications are satisfied before initiating a transaction. If the specifications are satisfied (e.g., there is low latency and no network partition), then protocol determiner 220 determines that the bandwidth optimized two-phase commit protocol should be used for a transaction. If the above specifications are not satisfied (e.g., there is high latency and/or a network partition has been detected), then protocol determiner 220 determines that a conventional two-phase commit protocol should be used. The determined conventional two-phase commit protocol may be a presumed nothing, presumed commit, or presumed abort two-phase commit protocol.

It is possible for the transaction manager 205 or one or more participants to fail during a transaction. In some cases, transaction manager 205 or a participant may fail without knowing whether the transaction was successfully completed (committed). In such an instance, the transaction manager 205 may perform a recovery, in which it reviews its transaction logs to find transactions that were in process during the failure. Transaction manager 205 may then report an outcome of the transaction to participants listed in the transaction log. If a particular participant failed during the transaction (e.g., while waiting a particular time period to receive a roll back response), then after reloading the participant may review its log to identify the unresolved transaction. The participant may then query the transaction manager regarding an outcome of the transaction, and may commit or roll back the transaction based on a received response to the query.

Figure 2B:
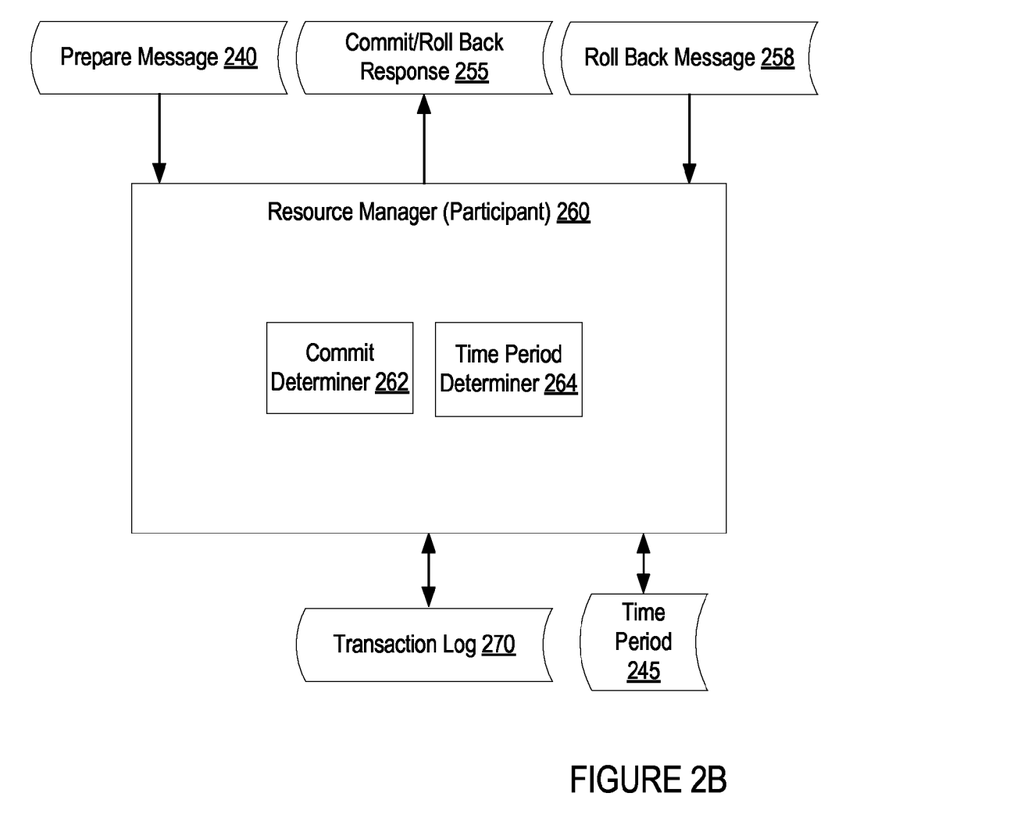
FIG. 2B illustrates a block diagram of a resource manager that participates in distributed transactions that use a bandwidth optimized two-phase commit protocol, in accordance with one embodiment of the present invention.

FIG. 2B illustrates a block diagram of a resource manager 260 that participates in distributed transactions that use a bandwidth optimized two-phase commit protocol, in accordance with one embodiment of the present invention. The resource manager 260 may include a commit determiner 262 and a time period determiner 264.

Resource manager 260 may be a participant in a distributed transaction. Resource manager may receive a prepare message 240. Responsive to the prepare message, resource manager 260 may record a state of a managed resource in a transaction log 270. Resource manager 260 may also store information about the transaction in the transaction log 270. Resource manager may then perform one or more operations that modify a state of a managed resource.

Before, during or after resource manager 260 performs the operations, commit determiner 262 determines whether the resource manager 260 can commit to the transaction. If the resource manager 260 can commit to the transaction, then commit determiner 262 sends a commit response 255 to a coordinator of the transaction. Otherwise, the commit determiner 262 sends a roll back message 255 to the coordinator.

After sending a commit response 255 to the coordinator, the resource manager 260 waits a time period 245 to receive a roll back message 258. If resource manager 260 receives a roll back message 258 within the time period 245, resource manager 260 rolls back the transaction based on data in the transaction log 270. If resource manager 260 fails to receive a roll back message 258 within the time period, commit determiner 262 commits the transaction.

In one embodiment, resource manager 260 includes time period determiner 264, which may determine the time period 245. Alternatively, resource manager 260 may receive the time period 245 from the coordinator or from a system administrator. Time period determiner 264 may operate as described above with regards to time period determiner 215.

Figure 3:
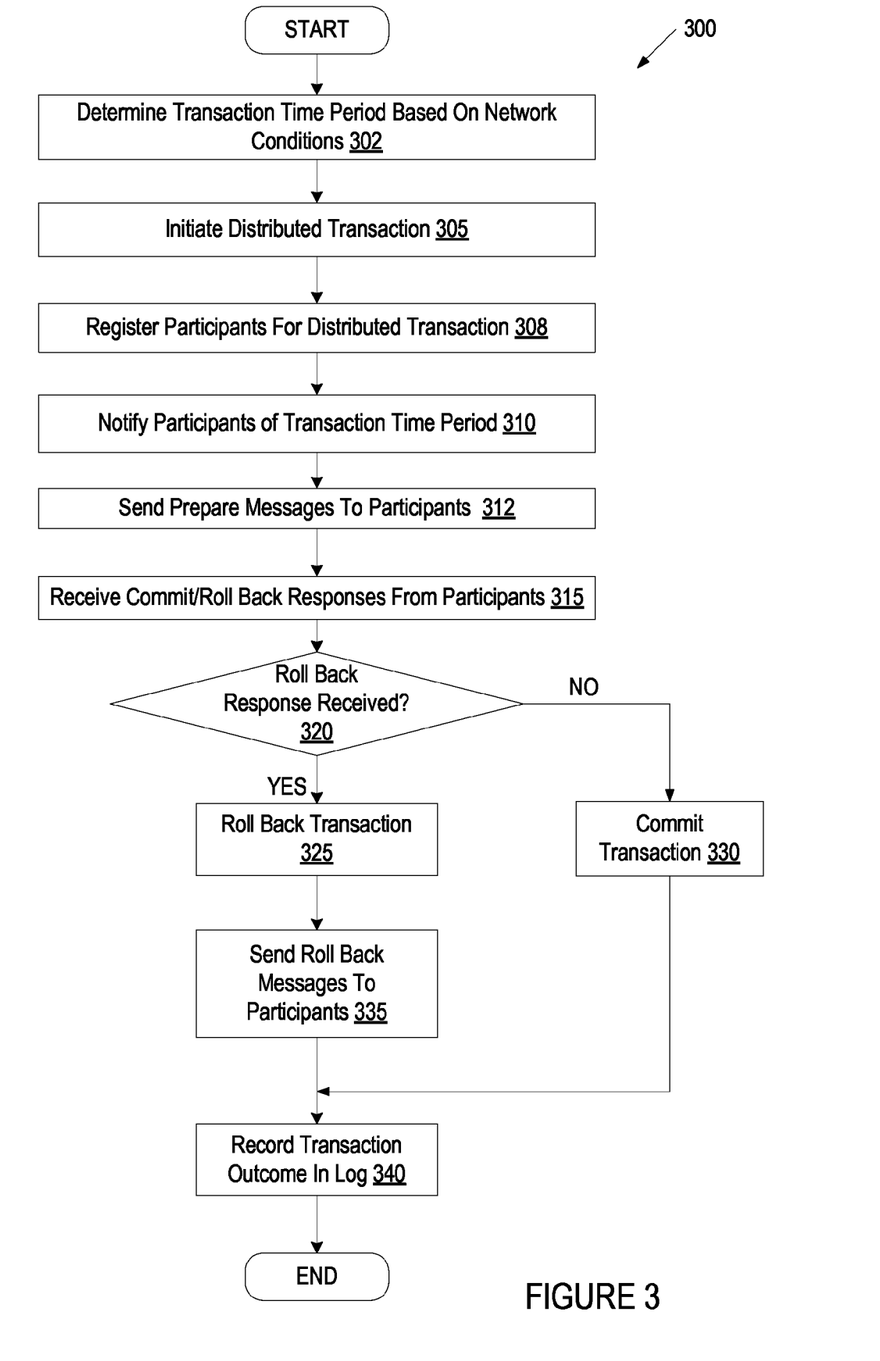
FIG. 3 illustrates a flow diagram of one embodiment for a method of managing a distributed transaction using a bandwidth optimized two-phase commit protocol.

FIG. 3 illustrates a flow diagram of one embodiment for a method 300 of managing a distributed transaction using a bandwidth optimized two-phase commit protocol. The method is performed by processing logic that comprises hardware (e.g., circuitry, dedicated logic, programmable logic, microcode, etc.), software (such as instructions run on a processing device), or a combination thereof. In one embodiment, method 300 is performed by a transaction manager running on a computing device (e.g., first transaction manager 120 of FIG. 1).

Referring to FIG. 3, at block 302 of method 300, processing logic determines a transaction time period based on network conditions and/or based on other data. At block 305, processing logic initiates a distributed transaction. Processing logic may initiate the distributed transaction in response to a request from a transaction application for a distributed transaction. This includes creating a transaction identifier and transaction context for the new transaction. The transaction manager then sends the transaction identifier for the new transaction to the requestor, which may be a client application. The requestor can propagate the transaction identifier to each of the resource managers and/or additional client applications that will participate in the transaction. These resource managers and/or additional client applications can then request to be enlisted/registered in the new transaction based on providing the transaction identifier for the new transaction.

At block 308, processing logic identifies participants for the distributed transaction. The participants may be dictated to the processing logic by the transaction application. Alternatively, or in addition, processing logic may determine resource managers to include as participants for the distributed transaction. Processing logic then registers the identified participants for the distributed transaction.

At block 310, processing logic notifies the participants of the transaction time period that will be used for the transaction. Alternatively, processing logic may have notified all resource managers on a distributed system of the time period (e.g., if the time period is not specific to a particular transaction). Such notification may have occurred before initiating the transaction.

At block 312, processing logic sends prepare messages to the participants of the transaction. At block 315, processing logic receives commit or roll back responses from the participants. The prepare messages may be sent to the participants sequentially in a particular participant order. In such an embodiment, processing logic may wait for a response from a participant before sending the prepare message to a next participant. Alternatively, the prepare messages may be sent to the participants simultaneously, all at once and/or without waiting for any response messages.

At block 320, processing logic determines whether any roll back responses have been received. If prepare messages were sent sequentially and a roll back response was received, then prepare messages may not be sent to all participants. For example, if a second participant out of 10 participants sends a roll back message, then prepare messages may not be sent to participants 3-10. If at block 320 a roll back response was received, the method continues to block 325. Otherwise the method proceeds to block 330.

At block 325, processing logic rolls back (aborts) the transaction. At block 335, processing logic may send roll back messages to the participants.

At block 330, processing logic commits the transaction. The transaction may be committed without sending out any commit messages or waiting for commit confirmations from participants. This may provide a significant reduction in network bandwidth utilization as compared to traditional distributed transactions.

Figure 4:
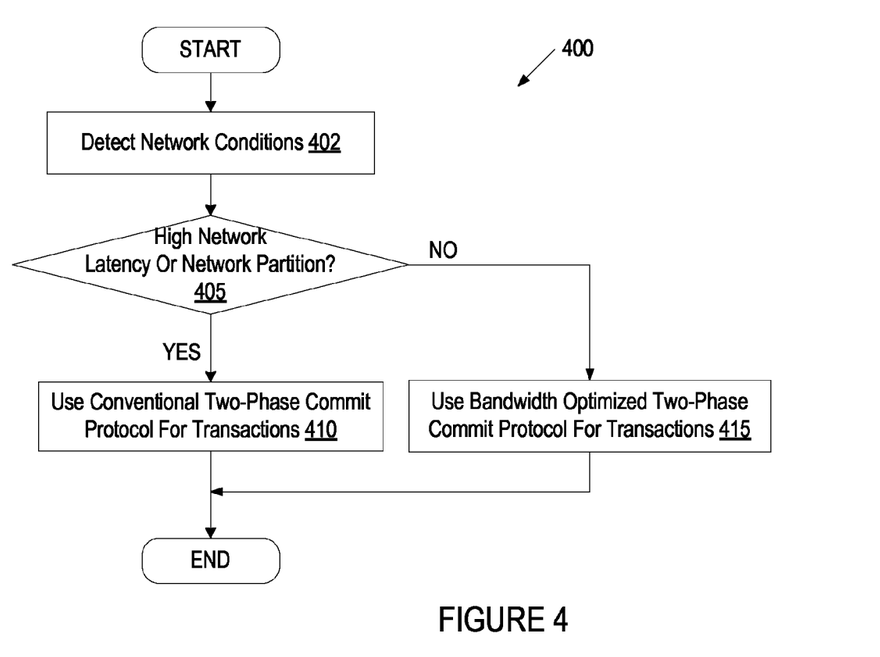
FIG. 4 illustrates a flow diagram of one embodiment for a method of selecting a two-phase commit protocol to use for a distributed transaction.

FIG. 4 illustrates a flow diagram of one embodiment for a method 400 of selecting a two-phase commit protocol to use for a distributed transaction. The method is performed by processing logic that comprises hardware (e.g., circuitry, dedicated logic, programmable logic, microcode, etc.), software (such as instructions run on a processing device), or a combination thereof. In one embodiment, method 400 is performed by a transaction manager running on a computing device (e.g., first transaction manager 120 of FIG. 1).

Referring to FIG. 4, at block 402 of method 400 processing logic detects network conditions. At block 405, processing logic determines whether there is a high network latency (a network latency over a predetermined latency threshold) and/or whether there is a network partition. If either a high network latency or a network partition are detected, then the method proceeds to block 410, and a conventional two-phase commit protocol will be used for future transactions. Otherwise, the method continues to block 415, and a bandwidth optimized two-phase commit protocol will be used for transactions. Processing logic may perform method 400 periodically, before each transaction, or on some other basis.

Figure 5:
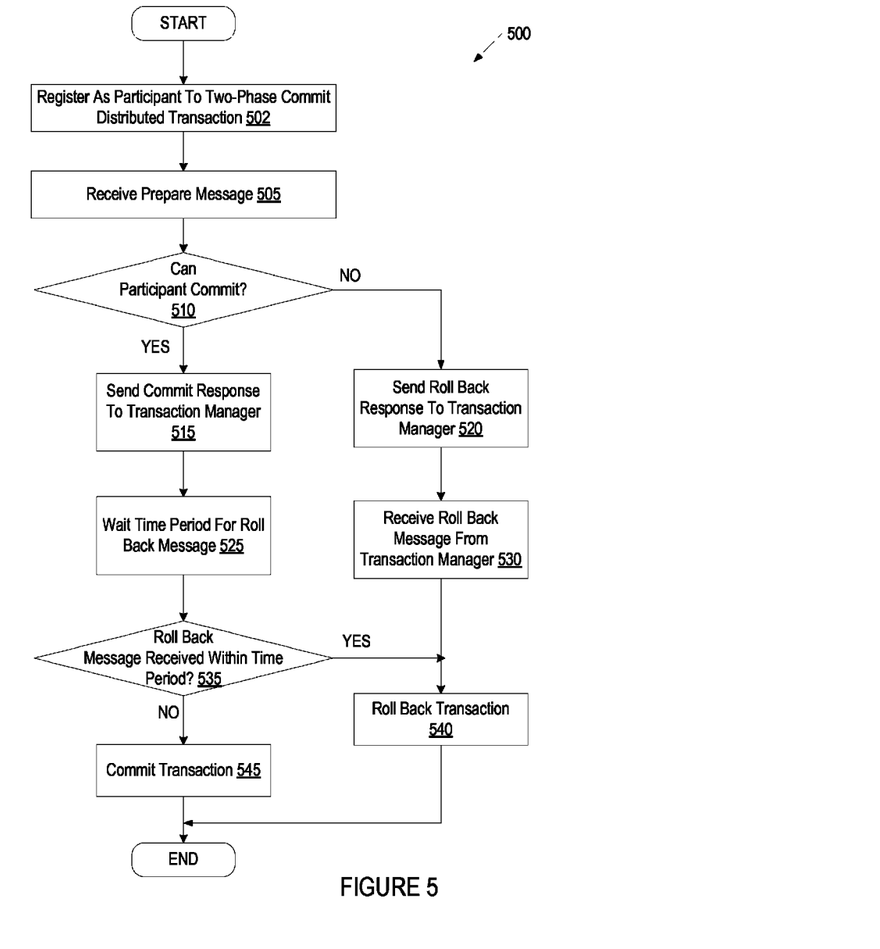
FIG. 5 illustrates a flow diagram of one embodiment for a method of participating in a distributed transaction using a bandwidth optimized two-phase commit protocol.

FIG. 5 illustrates a flow diagram of one embodiment for a method 500 of participating in a distributed transaction using a bandwidth optimized two-phase commit protocol. The method is performed by processing logic that comprises hardware (e.g., circuitry, dedicated logic, programmable logic, microcode, etc.), software (such as instructions run on a processing device), or a combination thereof. In one embodiment, method 500 is performed by a resource manager running on a computing device (e.g., first resource manager 115 of FIG. 1).

Referring to FIG. 5, at block 502 of method 500 processing logic registers as a participant to a bandwidth optimized two-phase commit distributed transaction. At block 505, processing logic receives a prepare message from a transaction manager acting as a coordinator for the transaction. At block 510, processing logic determines whether to commit to the transaction. If processing logic can commit to the transaction, the method continues to block 515. Otherwise, the method proceeds to block 520.

At block 515, processing logic sends a commit response to the transaction manager. At block 525, processing logic waits a particular time period to receive a roll back message from the transaction manager. The time period may have been determined by the processing logic, may have been received from the transaction manager (e.g., in the prepare message), or may have been set by an administrator. At block 535, processing logic determines whether a roll back message was received within the time period. If such a roll back message was received, the method proceeds to block 540. Otherwise the method continues to block 545 and the processing logic commits the transaction.

At block 520, processing logic sends a roll back response to the transaction manager. At block 530, processing logic receives a roll back response form the transaction manager. Alternatively, no roll back message may be received. At block 540, processing logic rolls back the transaction. The method then ends.

Figure 6:
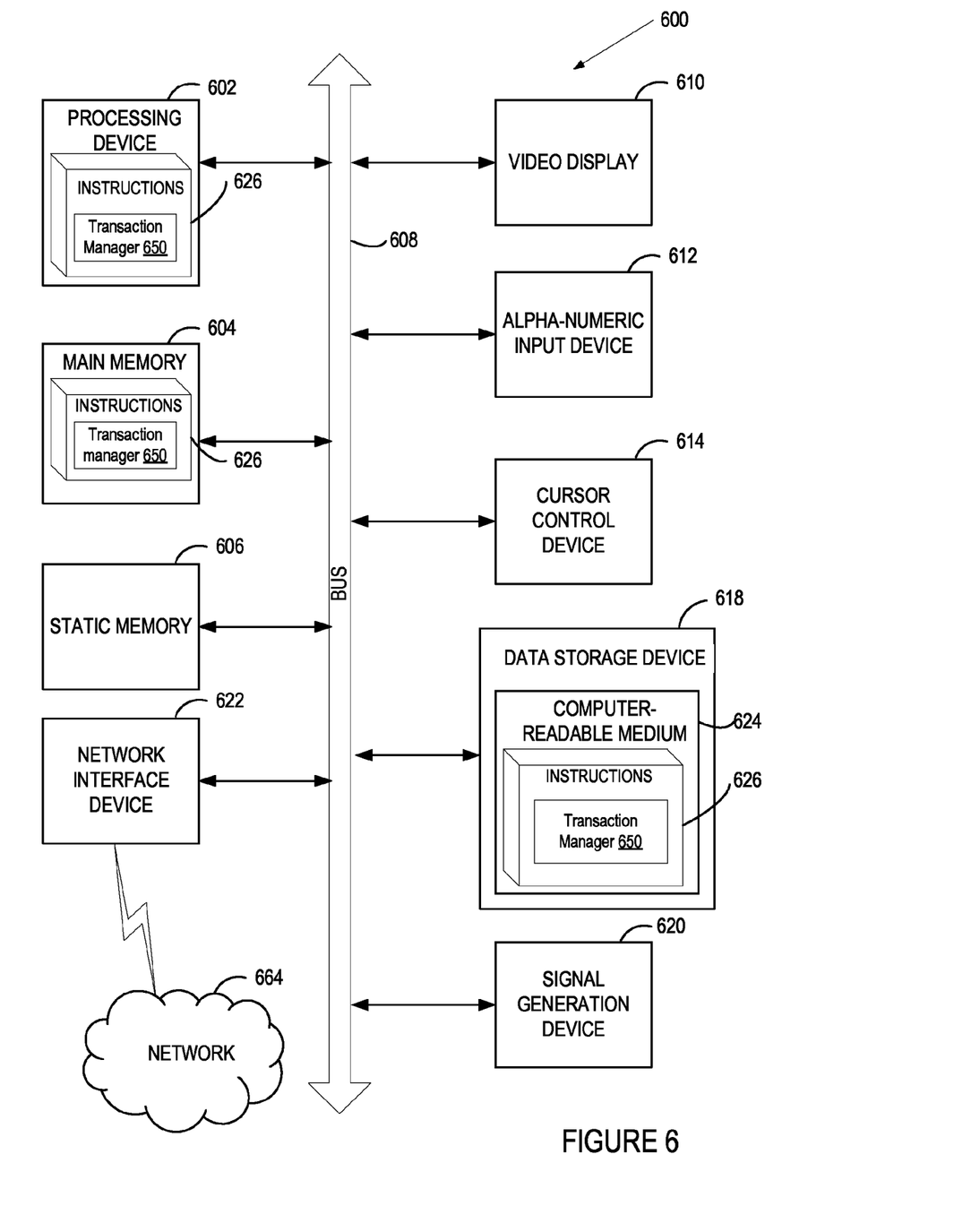
FIG. 6 illustrates a block diagram of an example computer system, in accordance with one embodiment of the present invention.

FIG. 6 illustrates a diagrammatic representation of a machine in the example form of a computing device 600 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory (e.g., a data storage device 618), which communicate with each other via a bus 608.

Processing device 602 represents one or more general-purpose processors such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. Processing device 602 is configured to execute the processing logic (instructions 626) for performing the operations and steps discussed herein.

The computing device 600 may further include a network interface device 622. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 618 may include a machine-readable storage medium (or more specifically a computer-readable storage medium) 624 on which is stored one or more sets of instructions 626 embodying any one or more of the methodologies or functions described herein. The instructions 626 may also reside, completely or at least partially, within the main memory 604 and/or within the processing device 602 during execution thereof by the computer system 600, the main memory 604 and the processing device 602 also constituting computer-readable storage media.

The computer-readable storage medium 624 may also be used to store a transaction manager 650 and/or resource manager (e.g., the first transaction manager 120, first resource manager 115, second transaction manager 145 etc. of FIG. 1), and/or a software library containing methods that call transaction managers or resource managers. While the computer-readable storage medium 624 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

It is to be understood that the above description is intended to be illustrative, and not restrictive. Many other embodiments will be apparent upon reading and understanding the above description. Although embodiments of the present invention have been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
sending, by a processing device executing a transaction manager, prepare messages to a plurality of participants of a two-phase commit distributed transaction;
determining, by the processing device, a time period to wait for the plurality of participants to commit the two-phase commit distributed transaction;
responsive to not receiving an abort response from a participant of the plurality of participants within the time period, committing the two-phase commit distributed transaction at an end of the time period; and
ending the two-phase commit distributed transaction without first sending commit messages to the plurality of participants.

2. The method of claim 1, further comprising:
responsive to receiving an abort response from at least one participant of the plurality of participants:
rolling back the two-phase commit distributed transaction; and
sending roll back messages to the plurality of participants within the time period.

3. The method of claim 2, further comprising:
responsive to detecting that the two-phase commit distributed transaction is committed, recording the committed two-phase commit distributed transaction; and
responsive to detecting that the two-phase commit distributed transaction is rolled back, recording the rolled back two-phase commit distributed transaction.

4. The method of claim 1, further comprising:
notifying the plurality of participants of the time period.

5. The method of claim 4, further comprising:
responsive to detecting a change in network conditions, determining a new time period in view of the change in network conditions; and
notifying the plurality of participants of the new time period.

6. The method of claim 1, further comprising:
responsive to detecting that at least one of a network partition or network latency exceeds a latency threshold, using a conventional two-phase commit protocol for a subsequent two-phase commit distributed transaction, wherein using the conventional two-phase commit protocol comprises:
after committing the subsequent two-phase commit distributed transaction, sending commit messages to participants of the subsequent two-phase commit distributed transaction, wherein the commit messages cause the participants of the subsequent two-phase commit distributed transaction to commit to the subsequent two-phase commit distributed transaction.

7. The method of claim 6, further comprising:
responsive to detecting that at least one of the network partition or the network latency is rectified, using a bandwidth optimized two-phase commit protocol for a next two-phase commit distributed transaction, wherein using the bandwidth optimized two-phase commit protocol comprises:
after committing the next two-phase commit distributed transaction, ending the next two-phase commit distributed transaction without first sending commit messages to participants of the next two-phase commit distributed transaction, wherein the participants of the next two-phase commit distributed transaction commit to the next two-phase commit distributed transaction after failing to receive roll back messages within a specified time period.

8. A non-transitory computer readable storage medium having instructions that, when executed by a processing device, cause the processing device to:
send, by the processing device executing a transaction manager, prepare message to a plurality of participants of a two-phase commit distributed transaction;

determine, by the processing device, a time period to wait for the plurality of participants to commit the two-phase commit distributed transaction;

determining whether an abort response is received from the plurality of participants within the time period; and responsive to not receiving an abort response from a participant of the plurality of participants within the time period, commit the two-phase commit distributed transaction by the processing device.

9. The non-transitory computer readable storage medium of claim 8, wherein the instructions further cause the processing device to:

responsive to determining that the abort response is received within the time period, roll back the two-phase commit distributed transaction.

10. The non-transitory computer readable storage medium of claim 8, wherein the instructions further cause the processing device to:

after recovering from a system failure that occurred within the time period, query the transaction manager regarding an outcome of the two-phase commit distributed transaction; and commit or roll back the two-phase commit distributed transaction in view of a received response to the query.

11. The non-transitory computer readable storage medium of claim 8, wherein the instructions further cause the processing device to notify the plurality of participants of the time period.

12. The non-transitory computer readable storage medium of claim 11, wherein the instructions further cause the processing device to:

responsive to detecting a change in network conditions, determine a new time period in view of the change in network conditions; and notify the plurality of participants of the new time period.

13. The non-transitory computer readable storage medium of claim 11, wherein to detect the change in network conditions the instructions further cause the processing device to:

detect that at least one of a network partition or network latency exceeds a latency threshold, and receiving the new time period from the transaction manager.

14. A computing device comprising:

a memory to store two-phase commit distributed transactions; and a processing device, operatively coupled to the memory, the processing device to:

send prepare messages to a plurality of participants of a two-phase commit distributed transaction from the memory; and determine, by the processing device, a time period to wait for the plurality of participants to commit the two-phase commit distributed transaction;

responsive to not receiving an abort response from a participant of the plurality of participants within the time period, commit the two-phase commit distributed transaction at an end of the time period; and end the two-phase commit distributed transaction without first sending commit messages to the plurality of participants.

15. The computing device of claim 14, wherein the processing device is further to:

responsive to receiving an abort response from at least one participant of the plurality of participants:

roll back the two-phase commit distributed transaction; and send roll back messages to the plurality of participants within the time period.

16. The computing device of claim 15, wherein the processing device is further to:

responsive to detecting that the two-phase commit distributed transaction is committed, record the committed two-phase commit distributed transaction in the memory; and responsive to detecting that the two-phase commit distributed transaction is rolled back, record the rolled back two-phase commit distributed transaction in the memory.

17. The computing device of claim 14, wherein the processing device is further to:

notify the plurality of participants of the time period.

18. The computing device of claim 17, wherein the processing device is further to:

responsive to detecting a change in network conditions, determine a new time period in view of the change in network conditions; and notify the plurality of participants of the new time period.

19. The computing device of claim 14, wherein the processing device is further to:

responsive to detecting that at least one of a network partition or a network latency exceeds a latency threshold, use a conventional two-phase commit protocol for a subsequent two-phase commit distributed transaction, wherein using the conventional two-phase commit protocol comprises:

after committing the subsequent two-phase commit distributed transaction, send commit messages to participants of the subsequent two-phase commit distributed transaction, wherein the commit messages cause the participants of the subsequent two-phase commit distributed transaction to commit to the subsequent two-phase commit distributed transaction.

20. The computing device of claim 19, wherein the processing device is further to:

responsive to detecting that at least one of the network partition or the network latency is rectified, use a bandwidth optimized two-phase commit protocol for a next two-phase commit distributed transaction, wherein using the bandwidth optimized two-phase commit protocol comprises:

after committing the next two-phase commit distributed transaction, end the next two-phase commit distributed transaction without first sending commit messages to participants of the next two-phase commit distributed transaction, wherein the participants of the next two-phase commit distributed transaction commit to the next two-phase commit distributed transaction after failing to receive roll back messages within a specified time period.

* * * * *